United States Patent [19]

Fujioka

[11] 4,238,929
[45] Dec. 16, 1980

[54] ARRANGEMENT TO COOL OIL IN HYDRAULIC CONTROL SYSTEM OF AUTOMATIC TRANSMISSION FOR INDUSTRIAL VEHICLE

[75] Inventor: Kazuyoshi Fujioka, Tokyo, Japan
[73] Assignee: Nissan Motor Company, Limited, Yokohama, Japan
[21] Appl. No.: 52,134
[22] Filed: Jun. 26, 1979

[30] Foreign Application Priority Data

Jun. 27, 1978 [JP] Japan .................................. 53/76937

[51] Int. Cl.³ .......................................... F16D 33/00
[52] U.S. Cl. ........................................ 60/336; 60/337; 60/358; 60/456; 60/458; 192/4 C
[58] Field of Search .................. 60/329, 337, 339, 358, 60/456–458, DIG. 3, DIG. 5, 336; 192/4 A, 13 R, 4 C

[56] References Cited

U.S. PATENT DOCUMENTS

| | | | |
|---|---|---|---|
| 2,638,746 | 5/1953 | Kelley | 60/329 |
| 3,631,948 | 1/1972 | Ishikawa | 192/4 C |
| 4,096,693 | 6/1978 | Kawamoto | 60/337 |
| 4,147,242 | 4/1979 | Fujioka | 60/339 X |

*Primary Examiner*—Irwin C. Cohen
*Attorney, Agent, or Firm*—Thompson, Birch, Gauthier & Samuels

[57] ABSTRACT

The present invention relates to an arrangement to cool oil used in a hydraulic control system of an automatic transmission for an industrial vehicle. The hydraulic control system includes an operating pressure feed line, a pressure regulator valve to regulate the magnitude of pressure in the operating pressure feed line, feed passage means for feeding oil under pressure from the operating pressure feed line to a hydrokinetic torque converter, exhaust passage means for exhausting the oil from the torque converter, a pressure maintaining valve disposed in the exhaust passage means to maintain the magnitude of pressure within the torque converter to a predetermined level, and a lubricating oil feed line communicating with the exhaust passage means via the pressure maintaining valve and also with a lubricating oil port of the pressure regulator valve via a flow restrictor. The lubricating oil feed lines have two portions which may be subjected to cooling. The two portions are parallel to each other and lead from said exhaust passage means and from said lubricating oil port, respectively.

11 Claims, 6 Drawing Figures

ARRANGEMENT TO COOL OIL IN HYDRAULIC CONTROL SYSTEM OF AUTOMATIC TRANSMISSION FOR INDUSTRIAL VEHICLE

BACKGROUND OF THE INVENTION

The present invention relates to a hydraulic control system of an automatic transmission for an industrial vehicle such as a fork lift truck, a shovel loader or a bulldozer and more particularly to an arrangement to cool the oil in such hydraulic control system, the transmission herein referred to including a hydrokinetic torque converter and multiple-plate clutches.

Industrial vehicles perform frequent forward and backward movements at very low speeds and are subjected to frequent switching between forward and backward movements due to the nature of their usage so that temperature of the oil within a hydrokinetic torque converter is apt to rise so that the mean temperature of the oil circulating through the hydraulic control system also rises because the heated oil returns from the torque converter to a oil reservoir or oil tank.

This undesirable temperature rise of the oil lowers the viscosity of the oil so that poor lubrication performance results, sealing effectiveness decreases and sealing rubbers tend to change their characteristics at a fast rate. If an increase in temperature of the oil is excessive, the oil is subject to degradation and sludge is deposited.

In a conventional automatic transmission for an industrial vehicle an oil cooler is provided and is fluidly connected to an exhaust passage for exhausting oil from a torque converter to cool the oil from the torque converter, wherein the oil after being cooled by the oil cooler is drained to an oil tank.

The oil cooler takes the form of a heat exchanger disposed in a lower tank of an engine coolant cooling radiator so that the cooling capacity is inevitably fixed. Thus with the oil cooler the temperature of the lubricant can not be maintained within a predetermined temperature range providing appropriate viscosity if there is a drastic change in environment conditions or in its usage. Hence allowable change in environment conditions and in usage of an industrial vehicle is quite limited by its oil cooler capacity.

SUMMARY OF THE INVENTION

One aspect of the present invention resides in the provision of an arrangement to cool the oil in a hydraulic control system of an automatic transmission for an industrial vehicle, the automatic transmission including a hydrokinetic torque converter. The arrangement comprises a transmission case, an operating pressure feed line, a pressure regulator valve to regulate the magnitude of pressure in the operating pressure feed line, feed passage means for feeding oil under pressure from the operating pressure feed line to the torque converter and exhaust passage means for exhausting the oil from the torque converter. The transmission case is formed with two connectors, a first one of which communicates with said exhaust passage means and a second one of which communicates with a lubricating oil feed port of the pressure regulator valve. Whereby an oil cooler can be connected to any one of said two connectors or two oil coolers can be connected to said two connectors, respectively.

Another aspect of the present invention resides in the provision of an arrangement to cool the oil in a hydraulic control system of an automatic transmission for an industrial vehicle, the automatic transmission including a hydrokinetic torque converter. The arrangement comprises a transmission case, an operating pressure feed line, a pressure regulator valve to regulate the magnitude of pressure in the operating pressure feed line, feed passage means for feeding oil under pressure from the operating pressure feed line to the torque converter and exhaust passage means for exhausting the oil from the torque converter. The pressure regulator valve includes a drain port, a lubricating oil feed port and a hydraulic pressure responsive valve element that is displaceable to uncover said lubricating oil feed port before it uncovers the drain port upon regulating operation thereof. The transmission case is formed with two connectors, adapted to be connected to oil coolers, respectively, a first one of which communicates with the exhaust passage means leading from the torque converter and a second one of which communicates with said lubricating oil feed port of the pressure regulator valve. This transmission case is formed also with a mounting site for an oil filter. An adaptor is fixedly mounted onto said mounting site and has two nipples. An oil filter is fixedly mounted onto the adaptor to receive oil from the nipples of the adaptor. The arrangement comprises also two oil coolers each of which is selectively connectable between said first connector of said case and one of said two nipples of the adaptor or between said second connector of said case and the other one of said two nipples of the adaptor.

An object of the present invention is to increase the adaptability of an industrial vehicle to different environment conditions and the usage to which an automatic transmission for an industrial vehicle can be put under said different environmental conditions.

BRIEF DESCRIPTION OF THE DRAWINGS

The present invention will be hereinafter described in connection with the accompanying drawings, in which.

DESCRIPTION OF THE PREFERRED EMBODIMENT

Figure 1:
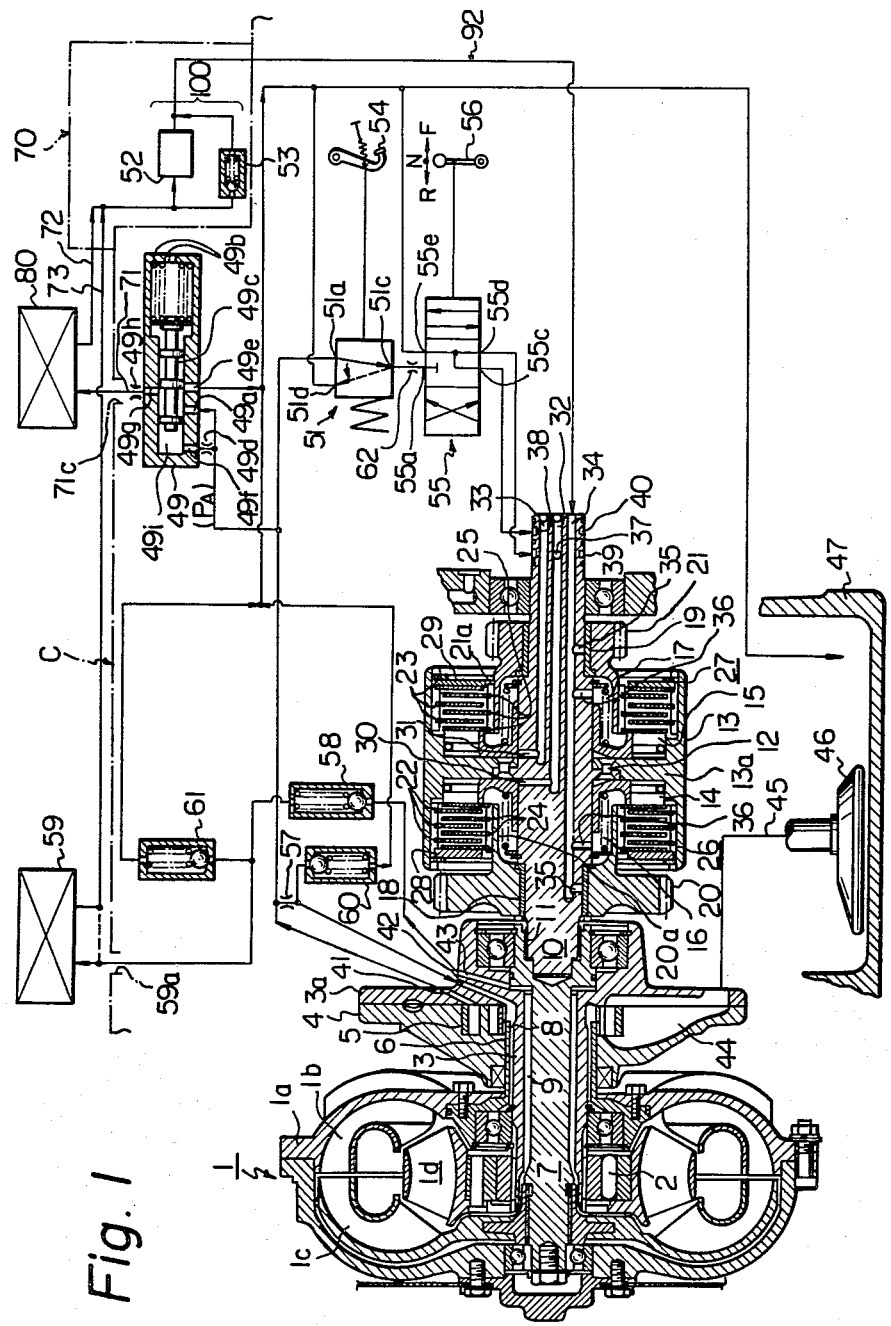
FIG. 1 is a schematic representation of a hydraulic control system of an automatic transmission for an industrial vehicle including an arrangement to cool the oil in the hydraulic control system shown in FIG. 2.

Referring first to FIG. 1, there is shown a hydraulic control system of an automatic transmission for an industrial vehicle, wherein the reference numeral 1 denotes a hydrokinetic torque converter a housing 1a of which is connected to an engine output shaft, not illustrated, for rotation therewith. Fixed to the converter housing 1a is a pump impeller 1b for rotation therewith. The pump impeller 1b which rotates upon receiving engine power will cause working oil within the torque converter 1, which is maintained at a constant level, to flow to a turbine runner 1c, and the stator impeller 1d in this order and then back to the pump impeller 1b. This flow of working oil will cause rotation, after torque multiplication, of the turbine impeller 1c because of the reaction by the stator impeller 1d.

The flange portion 3a of a hollow stationary shaft 3 and a pump cover 4 cooperate with each other to enclose a gear pump 5 which serves the function as an oil pump. The gear pump 5 includes an internally toothed outer gear and an inner gear meshing with the outer gear in a known manner. The inner gear is drivingly connected with the converter housing 1a via a pump driving shaft 6.

The turbine runner 1c is splined to a torque converter output shaft or a turbine shaft 7. Between the stationary sleeve shaft 3 and the turbine shaft 7 an annular passage 9 is formed and between the stationary sleeve shaft 3 and the pump driving shaft 6 another annular passage 8 is formed. The passage 8 communicates with the interior of the torque converter 1 for feeding thereto working oil, while the passage 9 communicates with the interior of the torque converter 1 for exhausting working oil from the torque converter 1.

Adjacent the rear end of the turbine shaft 7 is positioned a clutch input shaft 10 which is coaxially splined at 11 to the former for rotation therewith. A clutch drum 13 is coupled with the clutch input shaft 10 and riveted to same by means of a plurality of rivets 12. The clutch drum 13 includes a partition 13a which divides the interior of the same axially into two drum chambers. Slidably fit in these chambers are a piston 14 and a piston 15 and return springs 16 and 17 are disposed to urge the corresponding piston toward the partition 13a. On the clutch input shaft 10, a forward gear 20 and a reverse gear 21 are rotatably carried via respective bushings 18 and 19. Each gear 20 or 21 is formed with a cylindrical portion 20a or 21a axially extending into the clutch drum 13. A plurality of drive plates 22 and 23 are splined at the inner periphery of the clutch drum and positioned to extend around the cylindrical portions 20a or 21a, while a plurality of driven plates 24 and 25 are splined to the cylindrical portions 20a and 21a. The drive plates 22 and the driven plates 24 are alternatively arranged, with a forward clutch 26 being thus formed, while the drive plates 23 and the driven plates 25 are alternatively arranged, with a reverse clutch 27 being thus formed. The reference numerals 28 and 29 designate reaction members, respectively, which are supported by the clutch drum 13 to provide reaction to the pistons 14 and 15.

Between the partition 13a and the piston 14 is formed a hydraulic pressure chamber 30 and between the partition 13a and the piston 15 is formed another hydraulic pressure chamber 31, these chambers 30 and 31 communicating with hydraulic passages 32 and 33 extending through the clutch input shaft 10. The clutch input shaft 10 is also formed with a lubricant distributing passage 34 for lubrication of the clutches. Ports 35 and 36 are formed to open to this passage 34 so as to supply the bushings 18 and 19 and the clutches 26 and 27 with lubricant. The passages 32 and 33 have ports 37 and 38 opening to respective circumferential grooves 39 and 40 which are formed around the shaft 10. The lubricant distributing passage 34 terminates at an opening at one axial end of the shaft 10.

The flange portion 3a of the hollow stationary shaft 3 is formed with three ports 41, 42, 43 which are open to the discharge side of the pump 5, the passage 8 and the passage 9, respectively. A passage 44 communicates with the suction side of the pump 5 and a suction pipe or line 45 leads to this passage 44. The suction pipe 45 terminates at an oil filter 46 disposed immersed in the working oil contained within an oil tank 47 (positioned at lower portion of the transmission case).

The oil under pressure produced by the oil pump 5 is delivered from the port 41 to a port 49a of the regulator valve 49, to a port 49f of the regulator valve via an orifice 49d and to an inlet port 51a of a shut off valve 51. Thus an operating pressure feed line is defined. The regulator valve 49 includes a hydraulic pressure responsive valve element in the form of a spool 49c which is urged leftwardly by a spring 49b and regulates the magnitude of an operating pressure, viz., a so-called line pressure, within the operating pressure feed line. Therefore the pressure at the port 51a of the shut-off valve 51 is the line pressure. The pressure regulating operation of the pressure regulator valve 49 is such that an increase in pressure within a chamber 49i tends to displace the spool 49c against the spring 49b to uncover a drain port 49e thus decreasing this pressure, so that the spool takes such a position as to attain the equilibrium state between the pressure in the chamber 49i acting upon the left axial end of the spool 49c and the springs 49b.

The regulator valve 49 is formed with a lubricant feed port 49g which is disposed so that it will be uncovered or opened by the spool 49c immediately before the drain port 49e is uncovered as the spool is displaced in response to an increase in the pressure from the pump 5. The working oil or lubricant is discharged from this port 49g via a flow restricting orifice 49h and flows through a passage 71 to an oil cooler 80. The working oil from this oil cooler 80 flows through a passage 72 an oil filter 52, where it is filtered, and then to the lubricant distributing passage 34 via a passage 92.

A relief valve 53 is circuited to provide a flow path bypassing the oil filter 52 when the oil filter clogs.

The shut-off valve 51 takes the form of a valve with a spool operatively linked with a brake pedal 54 and operates such that when the brake pedal 54 is released the inlet port 51a communicates with an outer port 51c that is connected via an orifice 62 to an inlet port 55a of a selector valve 55. When the brake pedal 54 is depressed, the shut-off valve 51 changes to another position wherein the outlet port 51c communicates with a drain port 51d only and the communication of the outlet port 51c with the inlet port 51a is cut.

The selector valve 55 is in the form of a valve with a spool operatively linked with a manually operable selector lever 56. When the operator places the lever 56 in "N" position (neutral), the inlet port 55a is closed while outlet ports 55c and 55d communicate with a drain port 55e only. When the operator places the lever 56 in "F" position (forward), the inlet port 55a communicates with the outlet port 55d only and the outlet port 55c communicates with the drain port 55e only. When the operator places the lever 56 in "R" position (backward), the inlet port 55a communicates with the port 55c only and the outlet port 55d communicates with the drain port 55e only.

The outlet port 55d communicates with the chamber 30 for the forward clutch 26 via the groove 39, port 37, and passage 32. Thus this outlet port may be referred to as a forward port 55d. The other outlet port 55c of the selector valve 55 communicates with the chamber 31 for the reverse clutch 27 via the groove 40, port 38, and passage 33. Thus this outlet port may be referred to as a reverse port 55c.

Referring to feeding oil to and exhausting oil from the torus circuit of the interior of the torque converter 1, the passage 8 communicates with the operating pressure feed line via the port 42 and via an orifice 57 and communicates with the torus circuit of the torque converter 1 to feed oil under pressure from the operating pressure feed line to the torque converter 1 and the passage 9 communicates with the torus circuit of the torque converter to exhaust oil therefrom. The oil from the torque converter flows toward a pressure maintaining valve 58 in the form of a relief valve. The function of the pressure maintaining valve 58 is to maintain the pressure within the torus circuit of the torque converter 1 at a predetermined level.

Connected to the downstream side of the orifice 57 is a relief valve 60 which is a safeguard against the breakage of the torque converter 1 should a line leading from the pressure maintaining valve 58 to a connector 59a that is connected to an oil cooler 59, clog.

Connected to the line between the pressure maintaining valve 58 and the connector 59a is a relief valve 61 which is a safeguard against the breakage of the torque converter in addition to the safeguard provided by the pressure relief valve 60. The relief valve 61 also serves as a safeguard against the breakage of the oil cooler 59 should the oil cooler 59 clog.

The oil cooler 59 may take the form of a heat exchanger disposed in the lower tank of a radiator for cooling the engine coolant. The oil leaving the oil cooler 59 flows through a passage or line to the oil filter 52.

The hydraulic control system is similar in a number of respects to a hydraulic control system illustrated in FIGS. 2a and 2b of a copending United States patent application Ser. No. 832,381 filed on Sept. 12, 1977 by the same applicant as the present application and reference thereto may be made for a more complete understanding of the hydraulic control system of the present application. This copending application is now U.S. Pat. No. 4,147,242, issued to Fujioka, Kazuyoshi, on Apr. 3, 1979.

Figure 2:
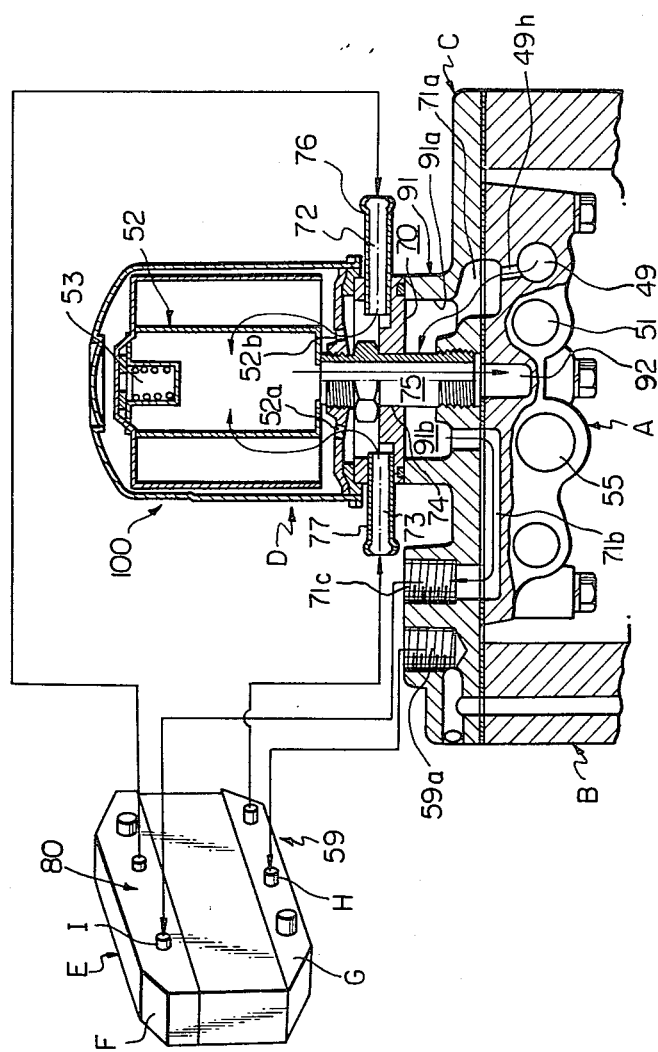
FIG. 2 is a schematic representation of the arrangement in accordance with the teachings of the present invention, the arrangement showing one of a number of connection possibilities.

Referring to FIG. 2 the same reference numerals are used to designate the same parts as illustrated in FIG. 1 for ease of identification of the parts or portions described in connection with FIG. 1 in the circuit structure shown in FIG. 2. The pressure regulator valve 49, a shut-off valve 51 and the manual selector valve 55 are defined or formed by a valve body A which is fixedly secured to a cover C for a transmission case B. The cover C is secured to close an opening formed in the transmission case B, thus forming part of the transmission case B.

The cover C is formed with two connectors 59a and 71c. The first connector 59a communicates with the exhaust passage means 43, 9 via the pressure maintaining valve 58 to receive oil discharged from this valve. The cover C is formed also with a mounting site in the form of an annular projection 91 for an oil filter. The annular projection 91 defines a recess 91a. A passage 71a is formed through the cover C to provide communication between the orifice 49h of the pressure regulator valve 49 and the recess 91a of the annular projection 91. Via a passage 71b defined between the cover C and the valve body A the second connector 71c communicates with the recess 91a of the annular projection 91. As will be noted from FIG. 2 the passage 92 which leads to the lubricant distributing passage 34 is formed in the valve body A (See also FIG. 1).

An adaptor 70 is fixedly mounted onto the mounting site 91 by means of a tubular connector 75. The tubular connector 75 has one end externally threaded to threadedly engage the cover C and extends through a central opening 74 formed through the adaptor 70. The opposite end of the tubular connector 75 is externally threaded to engage a cooperating nut whereby the adaptor 70 is held in sealing contact with the mounting site 91 to close the recess 91a of the annular projection 91, with the enclosed chamber 91b thus being formed. With this thus formed enclosed chamber 91b in the annular projection 91 the passage which interconnects the orifice 49h of the pressure regulator valve 49 and the second connector 71c is completed. Thus it can be seen that the adaptor 70 and the tubular connector 75 cooperate with the cover C to define the passage that interconnects the lubricant feed port 49g and the second connector 71c.

An oil filter unit 100 including the oil filter 52 and the relief valve 53 has a casing D fixedly mounted in a tight seal manner onto the adaptor 70 through threaded engagement with the threaded upper end, as viewed in FIG. 2, of the tubular connector 75.

Figure 3:
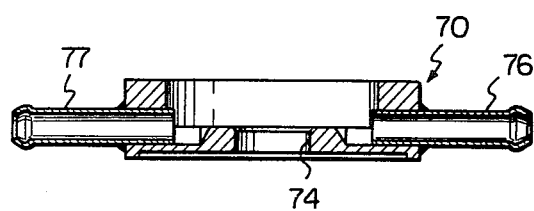
FIG. 3 is a sectional view of an adaptor having two nipples.
Figure 4:
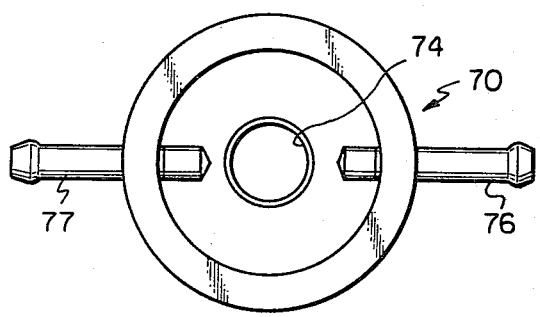
FIG. 4 is a plan view of the adaptor shown in FIG. 3.

As shown in FIGS. 3 and 4 the adaptor 70 is of a saucer-shaped configuration and includes two nipples 76 and 77 which extend radially outwards.

The oil cooler 59 is in the form of a cooling pipe H extending through a lower tank or header G of a radiator E through which water or engine coolant flows, while the other oil cooler 80 is in the form of a cooling pipe I extending through an upper tank or header F of the radiator E as shown in FIG. 2. If desired, these coolers may take other forms such as independent air cooled oil coolers.

The tubular connector 75 defines a passage which provides communication between the discharge side of the oil filter 52 and the passage 92 leading to the lubricant distribution passage 34.

The arrangement including the adaptor permits two possible operative connections between the two connectors 59a, 71c; two oil coolers 59, 80; and two nipples 76, 77. These two connections are shown in FIG. 2 and in FIG. 5, respectively, although more than two, operative connections are possible.

In the case of FIG. 2 oil discharged from the lubricant feed port 49g via the orifice 49h flows to the connector 71c via the passage 71a, the enclosed chamber within the annular projection 91, and the passage 71b. From the connector 71c the oil is conducted by a pipe to the oil cooler 80 and then to the nipple 76 by another pipe. Oil discharged from the exhaust passage means of the torus circuit 1 via the pressure maintaining valve 58 flows to the connector 59a. From the connector 59a the oil is conducted by a pipe to the oil cooler 59 and then to the nipple 77 by another pipe. As shown by arrows the two flows of oil reaching the nipples 76, 77 join before entering the casing D and then after being filtered by the oil filter 52 oil flows downwardly through the passage within the tubular connector 75 to the passage 92 which leads to the lubricant distributing passage 34.

Figure 5:
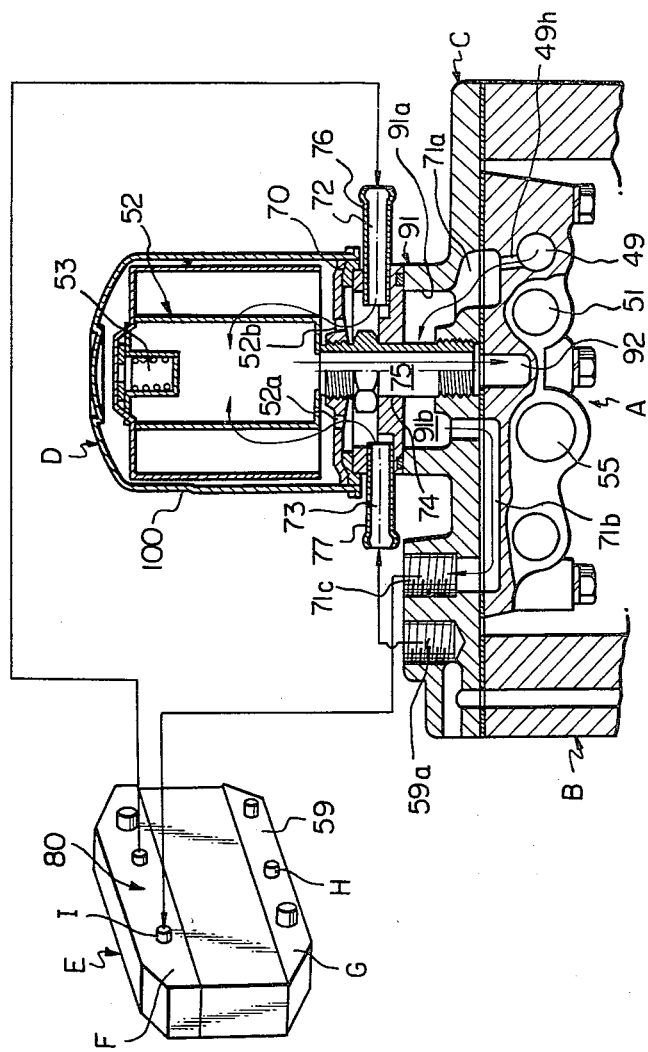
FIG. 5 is a similar view to FIG. 2 showing a second connection possibility.

In the case of FIG. 5 the operative connection is different from the case of FIG. 2 in that the connector 59a is directly connected to the nipple 77 bypassing the oil cooler 59, as shown in dashed line connection in FIG. 1.

OPERATION OF THE TRANSMISSION

When a vehicle operator places the selector lever 56 in "F" position, the inlet port 55a communicates with the forward port 55d so that the hydraulic pressure is delivered to the chamber 30, through the groove 39, port 37 and passage 32, thus engaging the forward clutch 26 as a result of leftward movement of the piston 14. The engagement of the clutch 26 causes the clutch input shaft 10, which is rotatable together with the turbine shaft 7, to rotate the gear 20 which forms part of a gear train (not illustrated) to establish a power flow path which permits the flow of power to the traction wheels of the vehicle to drive same forwardly.

When the vehicle operator places the selector lever 56 in "R" position, the inlet port 55a communicates with the reverse port 55c so that the hydraulic pressure is delivered to the chamber 31, through the groove 40, port 38 and passage 33, thus engaging the reverse clutch 27. The engagement of clutch 27 causes the clutch input shaft 10, which is rotatable with the turbine shaft 7, to rotate the gear 21 of the gear train to establish a power flow path which permits the flow of power to the traction wheels of the vehicle to drive same backwardly.

Under each of these running conditions, the hydraulic pressure acting upon the shut off valve 51 and the selector valve 55 increase because there is no drainage of oil through these valves. Accordingly, the hydraulic pressure for clutch engagement purposes supplied from the port 55c or 55d is maintained at a sufficiently high level, thus assuring slipless clutch engagement.

For the same reason the amount of flow of working oil through the torque converter 1 increases so that the amount of flow of the working oil passing through the pressure maintaining valve 58, oil cooler 59 and oil filter 52, to the lubricant distribution passage 34 increases sufficiently. Thus a sufficiently great amount of lubricant is supplied to the bushings 18, 19 via passage 34 and the ports 35 and also to spaces between drive and driven plates of the clutches 26, 27 via the passage 34 and the ports 36.

Under these conditions the amount of the working oil discharged from the port 49g also increases thus adding to the amount of lubricant supplied to the lubricant distributing passage 34.

When the operator places the selector lever 56 in "N" position, the inlet port 55a is closed and both ports 55c, 55d communicate with the drain port 55e. Accordingly, the clutches 26, 27 are disengaged or released so that the rotation of the clutch input shaft 10 is not transferred to any one of the gears 20, 21. Thus the vehicle comes to a standstill. However, since the inlet port 55a of the selector valve 55 is closed, the hydraulic pressure within the operating pressure line which extends from the pump 5 to the shut-off valve 51 is maintained at a sufficiently high level under this condition so that the clutches are lubricated with enough lubricant.

When the brake pedal 54 is depressed or stepped on, the spool of the shut-off valve 51 moves and the port 51a is closed and the degree of communication of the port 51c with the port 51d increases in accordance with the depression degree of the brake pedal. This causes a reduction in the hydraulic pressure delivered to the clutch which is engaged. Thus loose engagement of the clutch is attained. Under this condition, too, since the inlet port 51a of the shut-off valve 51 is closed, the hydraulic pressure upstream of the shut-off valve 51 is maintained at a high level, so this relatively high pressure acts upon the spool 49c of the regulator valve 49 and the spool 49c is urged rightwardly thus permitting the working oil to be discharged through the port 49g. The thus discharged working oil joins the working oil having passed through the torque converter 1 and then the oil cooler 59 and then flows through the oil filter 52 toward the clutch 26 or 27 via the lubricant distributing passage 32.

According to the above described mode of operative connection allowed by the adaptor 70, the working oil is subjected to cooling by both of the oil coolers 59 and 80 so that the cooling effect is great enough to meet the circumstances wherein the working fluid temperature is apt to rise, such as under heavy pay load, frequent use on steep inclines, use in tropical climates, high temperature regions or in summer.

Another mode of operative connection will be described in connection with FIG. 5.

FIG. 5 illustrates the case wherein only one of the coolers 59, 80 is used. In this case the outlet port 59a communicating with the pressure maintaining valve 58 of the torque converter is directly connected with the port 77 of the adaptor 70 and the port 71c is connected with the port 76 through the oil cooler 80, the port 71c being connected with the regulator valve 49 via the orifice 49h, passages 71a, 71b.

In this case, the return flow of the working oil from the torque converter 1 is directly introduced into the oil filter 52 without being subjected to cooling and joins the working oil having been cooled by the oil cooler 80 before entering the oil filter 52. The mixing of the two flows reduces the temperature of the working oil from the torque converter and after mixing the oil flows to the lubricant distributing passage 34 via the tubular connector 75 and the passage 92.

The cooling effect is relatively small in this case so this meets the circumstances wherein the temperature of the working oil does not rise so much, such as when the period of use is short, under winter season or cold weather region conditions.

If desired the connector 59a may be connected through the oil cooler 59 to the nipple 77, and the connector 71c is connected, bypassing the oil cooler 80, to the nipple 76. In this case, if the cooling capacity of the oil cooler 59 is larger than that of the oil cooler 80, this meets circumstances intermediate of the above-mentioned two extreme circumstances.

An arrangement to cool working oil according to the present invention makes it possible for a vehicle operator to switch the cooling performance of the vehicle in response to a change in circumstances, since connection between the two different oil coolers 59, 80 can be carried out by a vehicle operator without any skill because it is only necessary to change the connection of tubes and disassembly of the transmission is unnecessary.

Figure 6:
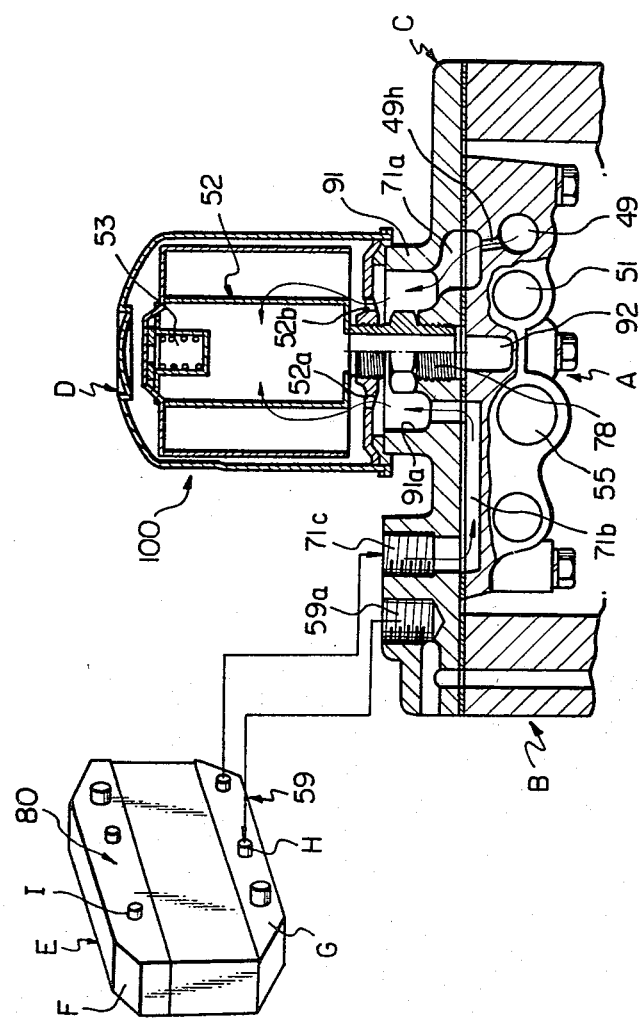
FIG. 6 is a schematic representation of an arrangement to cool the oil in a hydraulic control system similar to that shown in FIG. 1, this arrangement being different from the arrangement shown in FIG. 2 in that the adaptor is not used.

The fitting of the adaptor 70 is easy because it can be effected without disassembly of the transmission and while it is installed in the vehicle. Explaining this furthermore in connection with FIG. 6, the construction of a cover portion, including an oil filter portion, of a transmission case is illustrated. In this construction, a hollow connector 78 is threadedly engaged into the center of an annular projection 91 which serves as a mounting site for a case D of an oil filter unit 100. The oil filter unit 100 is in threaded engagement with the connector 78. The working oil flows from an outlet port 59a to an oil cooler 59 and the return flow from the oil cooler 59 is conducted through a passage 71b between a valve body A and the cover C. The working oil flows from the pressure regulator valve 49 into the case D via an orifice 49h and a passage 71a. This working oil and the return oil from the oil cooler 59 flow into the filter 52 via holes 52a, 52b of the case D of the oil filter unit 100. The oil after passing through the oil filter 52 flows through the connector 78 into a passage 92 which communicates with a lubricant distributing passage 34.

In the case of the arrangement according to the present invention after removing the oil filter unit 100 and the connector 78 (see FIG. 6), the adaptor 70 is placed on the annular projection 91 and fixedly mounted thereto by means of the connector 75 (see FIG. 5) and then the oil filter unit 100 is threadedly engaged with the connector 75. Since the removal of the cover C from the transmission case B is unnecessary, the fitting of the adaptor 70 can be carried out while the transmission is in situ.

The replacement or modification of the pressure regulator valve 49, which otherwise would be required if an oil cooler is connected to the drain port 49e, is unnecessary because the working oil to be supplied to the oil cooler 80 is discharged from the orifice 49h (see FIG. 1) which is disposed within an area adjacent, with respect to a direction of travel of the valve element 49c, to the drain port 49e and is uncovered prior to the uncovering of the drain port 49e as the valve element moves against the spring 49b.

A sufficient amount of working oil is discharged from the port 49g whenever the line pressure regulated by the regulator valve 49 is relatively high, although the line pressure becomes relatively low temporarily when the selector valve 55 is manipulated, so that the cooling performance is enhanced.

The working oil discharged from the pressure regulator valve 49 is subjected to cooling so that the increase in the pump 5 capacity which would be required if the line pressure is subjected to cooling is not necessary. Thus, any modification of the existing pump is not necessary.

What is claimed is:

1. An arrangement to cool the oil in a hydraulic control system of an automatic transmission for an industrial vehicle, the automatic transmission including a hydrokinetic torque converter, the arrangement comprising:

a transmission case;
   an operating pressure feed line;
   a pressure regulator valve to regulate the magnitude of pressure in said operating pressure feed line, said pressure regulator valve including a drain port, a lubricating oil feed port and a hydraulic pressure responsive valve element that is displaceable to uncover said lubricating oil feed port before it uncovers said drain port upon regulating operation thereof;
   feed passage means for feeding the oil under pressure from said operating pressure feed line to the torque converter and exhaust passage means for exhausting the oil from the torque converter;
   said transmission case being formed with two connectors, a first one of which communicates with said exhaust passage means;
   means for cooperating with said transmission case to define a passage interconnecting said lubricating oil feed port and a second one of said connectors;
   whereby an oil cooler can be connected to any one of said first and second connectors or two oil coolers can be connected to said first and second connectors, respectively.

2. An arrangement as claimed in claim 1, further comprising an oil cooler connected to said second connector to receive hydraulic fluid therefrom.

3. An arrangement as claimed in claim 2, further comprising an oil filter connected to said first connector to receive hydraulic fluid therefrom, said oil filter being in communication with portions of the automatic transmission to supply hydraulic fluid thereto for lubrication purposes.

4. An arrangement as claimed in claim 3, wherein said oil filter is connected to said oil cooler to receive hydraulic fluid therefrom.

5. An arrangement as claimed in claim 2, 3 or 4, further comprising a second oil cooler connected to said first connector to receive hydraulic fluid therefrom.

6. An arrangement as claimed in claim 1, wherein said transmission case is formed with a mounting site for an oil filter, said mounting site including a recess, and wherein said means includes an adaptor having two nipples, said adaptor closing said recess to define a chamber, said means also including a passage interconnecting said second connector and a passage interconnecting said lubricating oil feed port and said chamber, and further comprising an oil filter fixedly mounted onto said adaptor to receive hydraulic fluid from said nipples.

7. An arrangement as claimed in claim 6, wherein said transmission case includes a cover secured thereto, said cover including said two connectors and said mounting site.

8. An arrangement as claimed in claim 7, further comprising:
   two oil coolers each of which is selectively connectable between said first connector and one of said two nipples or between said second connector and the other one of said two nipples.

9. An arrangement as claimed in claim 8, wherein one of said two oil coolers is connected to said first connector of said cover to receive hydraulic fluid therefrom and is connected to one of said two nipples to discharge hydraulic fluid to said oil filter and wherein said second connector is connected to the other one of said two nipples to discharge hydraulic fluid to said oil cooler.

10. An arrangement as claimed in claim 8, wherein one of said two oil coolers is connected to said first connector to said cover to receive hydraulic fluid therefrom and is connected to one of said two nipples to discharge hydraulic fluid to said oil filter and wherein the other one of said two oil coolers is connected to said second connector to receive hydraulic fluid therefrom and is connected to the other one of said two nipples to discharge hydraulic fluid to said oil filter.

11. An arrangement as claimed in claim 8, 9 or 10, wherein said oil filter is in communication with portions of the automatic transmission to supply hydraulic fluid thereto for lubrication purposes.

* * * * *